United States Patent
Amir

(10) Patent No.: US 11,956,402 B2
(45) Date of Patent: Apr. 9, 2024

(54) HALFTONE SCREENS

(71) Applicant: Hewlett-Packard Development Company, L.P., Spring, TX (US)

(72) Inventor: Gideon Amir, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/792,613

(22) PCT Filed: Jan. 30, 2020

(86) PCT No.: PCT/US2020/015907
§ 371 (c)(1),
(2) Date: Jul. 13, 2022

(87) PCT Pub. No.: WO2021/154266
PCT Pub. Date: Aug. 5, 2021

(65) Prior Publication Data
US 2023/0039819 A1 Feb. 9, 2023

(51) Int. Cl.
*H04N 1/405* (2006.01)
*G06T 7/11* (2017.01)
*G06V 10/50* (2022.01)
*G06V 10/75* (2022.01)

(52) U.S. Cl.
CPC .............. *H04N 1/405* (2013.01); *G06T 7/11* (2017.01); *G06V 10/507* (2022.01); *G06V 10/751* (2022.01)

(58) Field of Classification Search
CPC ...... G06V 10/751; G06V 10/507; G06T 7/11; H04N 1/405
See application file for complete search history.

(56) References Cited

U.S. PATENT DOCUMENTS

| | | |
|---|---|---|
| 7,009,736 B2 | 3/2006 | Thakur |
| 7,365,883 B2 | 4/2008 | Damera-Venkata |
| 7,471,421 B2 | 12/2008 | Asai et al. |
| 8,111,428 B2 | 2/2012 | Asai et al. |
| 8,848,250 B2 | 9/2014 | Su et al. |

(Continued)

FOREIGN PATENT DOCUMENTS

EP     0945823 A2     9/1999

OTHER PUBLICATIONS

Verevka, O., et al., "Halftoning with image-based dither screens," Sep. 1, 1999, In Proceedings of the 1999 conference on Graphics interface, vol. 99, pp. 167-174.

*Primary Examiner* — John R Wallace

(57) ABSTRACT

In an example, a method includes, by one or more processors, receiving a greyscale image having a plurality of pixels, each pixel being associated with a grey level, and the greyscale image having a first number of grey levels. An order of the pixels may be determined based on the grey level. A second number of grey levels may be determined, wherein the second number of grey levels is greater than the first number, and an indication of a target number of pixels per grey level of the second number of grey levels may be further be determined. Taking the pixels in order, and based on the target number of pixels per grey level, a new grey level may be allocated to each pixel to provide the second number of grey levels. The new grey levels may be converted to a threshold of a threshold halftone screen.

15 Claims, 6 Drawing Sheets

(56) References Cited

U.S. PATENT DOCUMENTS

| | | |
|---|---|---|
| 9,066,037 B2 | 6/2015 | Yoshizawa |
| 9,167,130 B2 | 10/2015 | Damera-Venkata |
| 2004/0141189 A1 | 7/2004 | Dittrich et al. |
| 2005/0163385 A1* | 7/2005 | Thakur ................ G06V 10/28 382/168 |
| 2006/0066904 A1 | 3/2006 | Fischer et al. |
| 2006/0164659 A1* | 7/2006 | Foster .................. H04N 1/405 358/1.1 |
| 2008/0068660 A1* | 3/2008 | Loce ................ H04N 1/40075 358/1.9 |
| 2011/0222125 A1* | 9/2011 | Yasutomi ............ H04N 1/4058 358/3.06 |
| 2014/0093163 A1* | 4/2014 | Gross ..................... G06T 9/00 382/164 |
| 2018/0089812 A1* | 3/2018 | Wang .................. H04N 1/6005 |
| 2018/0139354 A1 | 5/2018 | Veis et al. |
| 2019/0332840 A1 | 10/2019 | Sharma et al. |

* cited by examiner

HALFTONE SCREENS

BACKGROUND

Printing systems may convert input data (for example, data representing an image for two-dimensional printing, or data representing an object for three dimensional printing) to print instructions, which specify where print materials (for example, colorants such as inks, toners or other printable materials) are to be placed in a print operation.

Techniques used in converting data include use of halftone screens. In some examples, halftone screens are implemented as arrays, or matrices, of threshold values, which correspond to pixels in input data. Values associated with pixels in the input data are compared to at least one threshold for that pixel and print material may be deposited (or not deposited) based on the comparison. Examples of halftone screens which allow control over the amount of print material deposited at a location include amplitude modulation halftone screens and frequency modulation halftone screens.

BRIEF DESCRIPTION OF DRAWINGS

For a more complete understanding, reference is now made to the following description taken in conjunction with the accompanying drawings in which.

DETAILED DESCRIPTION

In the case of two-dimensional printing, a print addressable location may comprise at least one pixel, and each print addressable location may be printed with at least one colorant such as inks (for example cyan, magenta, yellow and black inks), coatings or other print materials, as well as combinations of those print materials.

In the case of three-dimensional printing, which is also referred to as additive manufacturing, three-dimensional space may be characterised in terms of 'voxels', i.e. three-dimensional pixels, wherein each voxel occupies or represents a discrete volume. In examples of three-dimensional printing therefore, an addressable area may comprise at least one voxel and each voxel may be 'printed' i.e. generated or manufactured, using one or a combination of agents and/or build materials.

To briefly discuss three-dimensional printing in greater detail, objects generated by an additive manufacturing process may be formed in a layer-by-layer manner. In one example, an object is generated by solidifying portions of layers of build material. In examples, the build material may be in the form of a powder or powder-like material, a fluid or a sheet material. In some examples, the intended solidification and/or physical properties may be achieved by printing an agent which absorbs energy onto a layer of the build material. Energy may be applied to the layer and the build material on which an agent has been applied may coalesce and solidify upon cooling. In other examples, directed energy may be used to selectively cause coalescence of build material, or binding agents may be used to selectively solidify a build material. In other examples, three-dimensional objects may be generated by using extruded plastics or sprayed materials as build materials, which solidify to form an object.

Some processes that generate or print three-dimensional objects use control data or print instructions generated from a model of a three-dimensional object. This control data may, for example, specify the locations at which to apply an agent to the build material, or where a build material itself may be placed, and the amounts to be placed. Halftone screens may be used to determine where to place drops of agents (for example, energy absorbing agent, binding agents and/or colorant).

In examples of halftone screens, it may be intended to avoid patterns associated with the screen appearing in the printed output. For example, a 'moiré' pattern may be seen where clusters of dots repeat or, in the case of printing multiple colors (which may be printed in separate layers, or 'separations'), dots from one color may visually interfere with dots printed in another color. Such patterns may be seen to detract from image quality. Halftone screens may be designed to avoid such patterns appearing in printed outputs, or to minimise their occurrence or impact. However, in examples herein, halftone screens may be designed to deliberately include a pattern.

Figure 1:
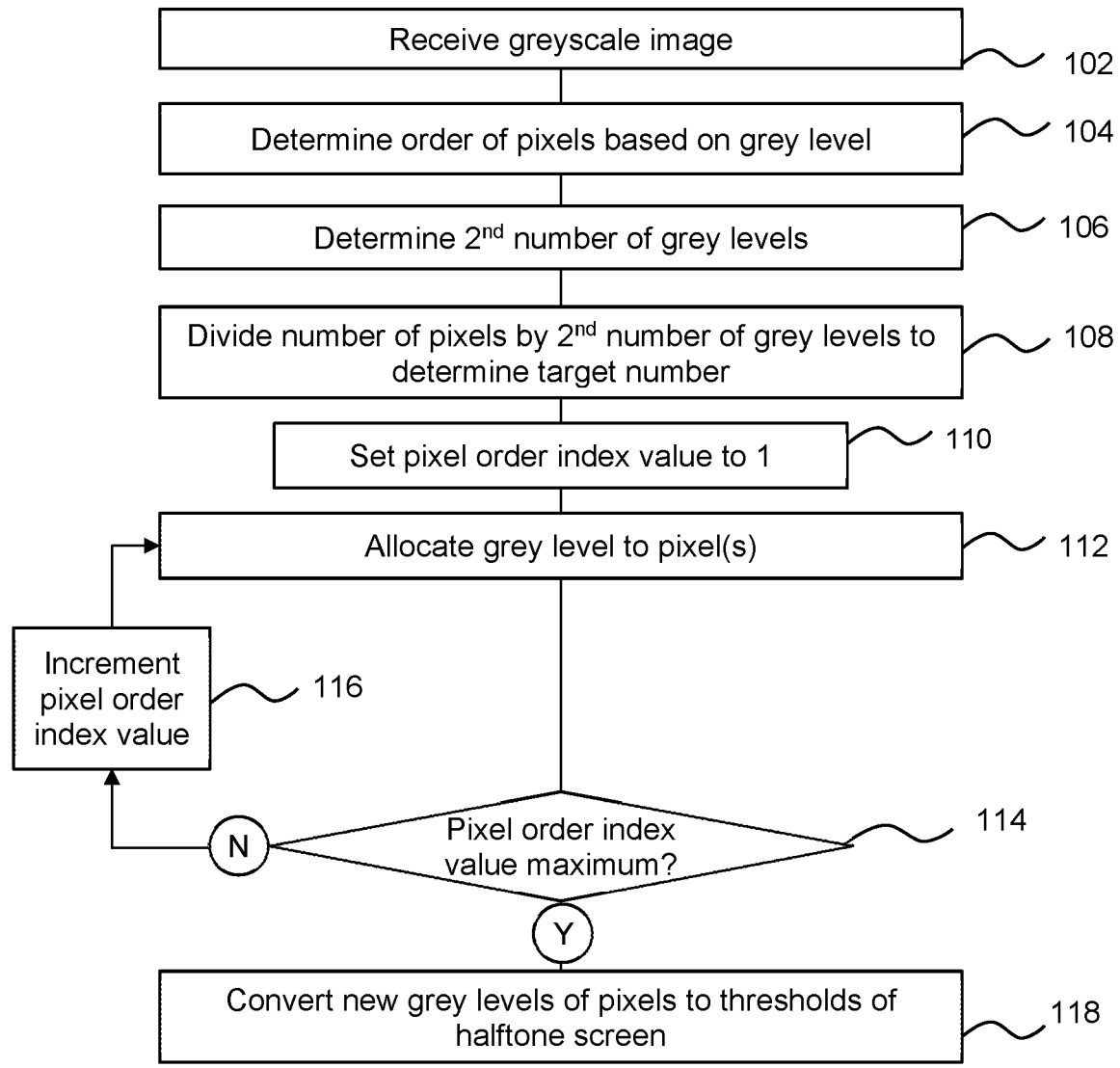
FIG. 1 is a flowchart of an example of a method of determining a halftone screen from a greyscale image.

FIG. 1 shows a flow chart of an example method, which may be a computer implemented method and may be a method of determining halftone screens from a greyscale image. In this example, the method comprises increasing the number of grey levels in a greyscale image, from a first number of grey levels in a received greyscale image to a second number. This may allow for linearization in conversion of the greyscale values to threshold values as, in practice, color density does not increase linearly with print agent amount, and therefore additional grey levels may allow for a closer or better mapping between grey levels and threshold values.

The method comprises, in block 102, receiving a greyscale image having a plurality of pixels, each pixel being associated with a grey level, and the greyscale image having a first number of grey levels. For example, the greyscale image may be an image having 256 grey levels, wherein black is designated as 0 and white is designated as 255.

Block 104 comprises determining an order of the pixels based on their grey levels. In particular, the order may arrange the pixels in the order of the magnitude of the grey level, starting from the lowest grey level and ending with the highest grey level. In this example, pixels having the same level are grouped. In other words, considering five pixels P1-P5 having the grey values of P1: 60, P2: 40, P3: 80, P4: 60 and P5: 120, these may be re-ordered as P2, {P1, P4}, P3, P5. Of course, in practice, there may be many more pixels to order. The order within the group(s) of pixels having the same value (indicated by the curly brackets { . . . } above) may be determined, for example randomly, based on the pixel index, or in some other way (for example, based on a spatial distribution). In this example, the pixels are allocated a pixel order index indicating their position in the order.

Block 106 comprises determining a second number of grey levels, wherein the second number of grey levels is greater than the first number. For example, as mentioned above, the first number maybe 256 (values from 0 to 255), as this scale is often used in greyscale images. However, to provide enough levels for accurate color calibration and linearization of the grey levels, the second number of grey levels may be around 750 (for example, to accurately map from an intended color to a print instruction given that the optical density/visual perception of a color does not always vary linearly with print agent amount). As further explained below, this may initially be an approximate target number.

Block 108 comprises determining an indication of a target number of pixels per grey level, in this example by dividing the number of pixels in the greyscale image by the target number of grey levels. For example, for a 72 by 72 pixel image, there are a total of 5184 pixels. If the second number of grey levels is to be around 750, then if the pixels are to be evenly distributed among the grey levels there may be 5184/750=6.9 pixels per grey level. As this is not a whole number, it may be rounded down to six. In this case as the number has been rounded down, there may be more than 750 grey levels for linearization/calibration. Therefore, in some examples, any floating point number may be rounded down. However, in practice, there may be fewer than 750 grey levels without undue visual impact when the halftone screen is applied to image data in due course. In other examples, as is set out below, the target number of pixels per grey level may not be a whole number of pixels. For example, the target number may be based on an integer number of sub-pixels, where the number of sub-pixels per grey level is not equal to a multiple of the number of sub-pixels per pixel. In this example, the second number of grey levels could therefore be defined as 5184/6=864 grey levels. In other words, the second number of grey levels may be initially defined as an approximate target, then redefined once the number of pixels per grey level to provide a number of grey levels in the region of the target is known.

Block 110 comprises setting a pixel order index value to 1. Then, taking the first pixel in the order determined in block 104, and the grey levels in order of magnitude (i.e. starting with the lowest grey level), the method proceeds by allocating a grey level to the pixel of the pixel order index in block 112, before (unless the pixel order index value is the maximum value, as determined in block 114) incrementing the pixel order index value by one in block 116 and looping back to block 104 to provide the determined target number of pixels per grey level. In other words, after the target number of pixels is allocated a particular grey level, the grey level is incremented.

Thus, in the example above, the first six pixels of the order (i.e. the pixels with the lowest pixel order indices in the ordered list of pixels, corresponding to pixels of low greyscale levels) will be allocated the lowest greyscale level. The next six will be allocated to the second lowest greyscale level, and so on. In other words, the pixels may be at least substantially evenly distributed over the grey levels of the second number of grey levels.

Once the method has worked through the ordered list of pixels, the condition set out in block 114, i.e. that the pixel order index value is the maximum value, is met, and the method proceeds to block 118, which comprises converting the new grey levels of each pixel to a threshold of a halftone screen.

For example, this may comprise a proportional conversion, wherein the threshold may be between 0 and 1 (between meaning in this example not equal to). Therefore, each determined threshold may have a value which is the grey level value of that pixel divided by the maximum value plus 1. This may be scaled to the image values of the pixel, or vice versa, for halftoning. In other examples to avoid the thresholds of 0 or 1, the maximum grey level and a grey level of 0 may not be assigned when assigning grey levels.

Such a halftone screen may be of use in processing image data for printing, wherein aspects of the halftone screen may be apparent in the printed output. For example, if the greyscale image comprises a pattern with light and dark areas, such a pattern may be discernible in the printed output. For example, the greyscale image may be indicative of a company logo. By embedding the logo into a halftone screen, it may be superimposed on an image, for example appearing as a watermark. The pattern may be repeated or tiled as mentioned above.

The method of FIG. 1 may therefore further comprise applying, by at least one processor, the halftone screen to image data to determine print instructions for printing the image. Applying the threshold matrix to image data comprises comparing an image data value for a pixel to each of the threshold values of the pixels of a corresponding pixel of the halftone screen; and determining an amount of print agent to be applied to a location on the substrate corresponding to that pixel based whether the threshold value is exceeded by an image data value. In some examples, the method may further comprise printing an image, for example using a printing apparatus.

Figure 2A:
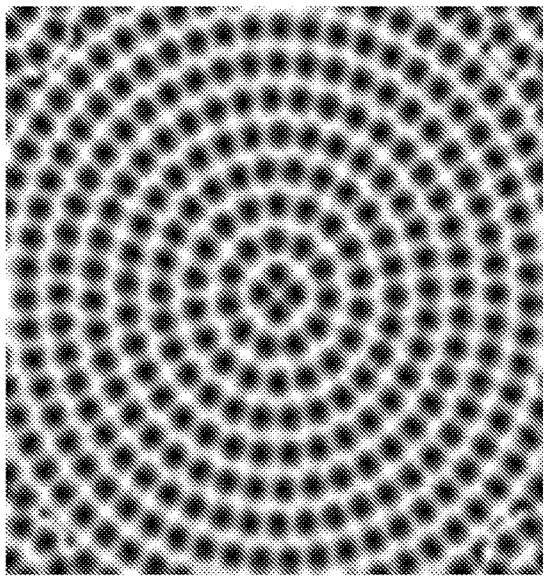
FIG. 2A shows an example representation of a halftone pattern.
Figure 2B:
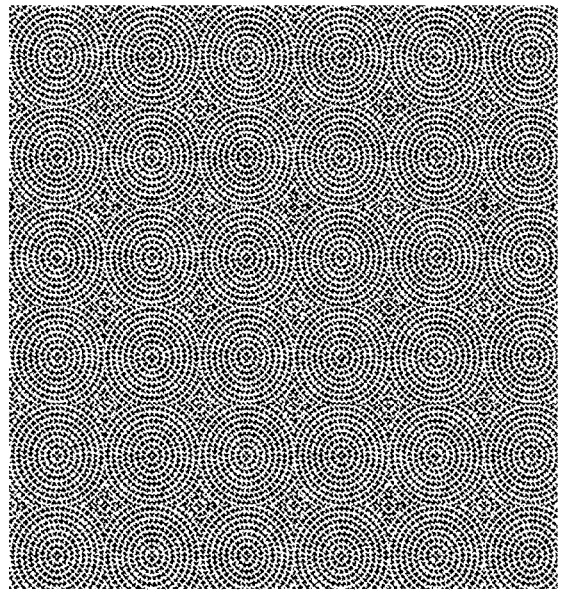
FIG. 2B shows an example a tiled greyscale image.
Figure 2C:
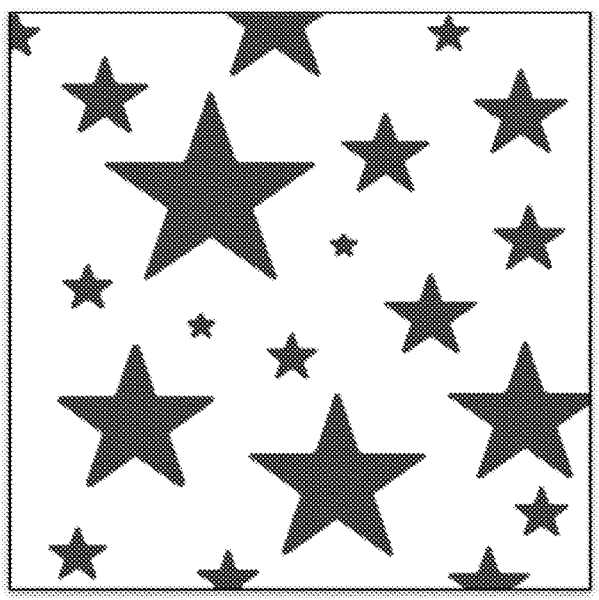
FIG. 2C shows a representation of example image data.
Figure 2D:
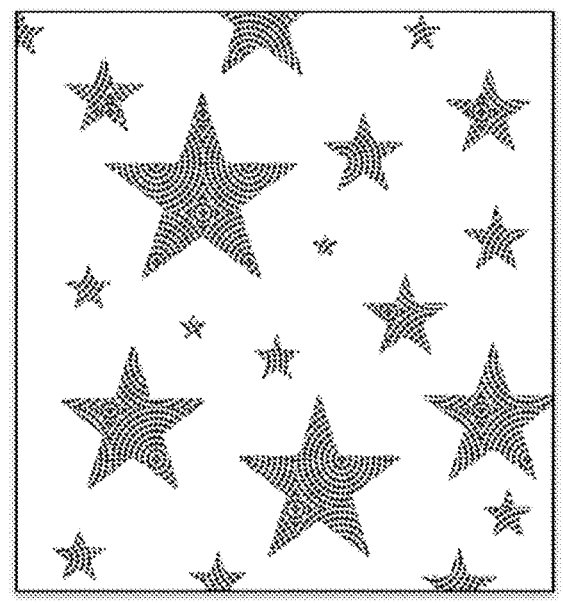
FIG. 2D shows an example of a printed output of an image having been halftoned using a halftone screen derived from a greyscale image.

FIG. 2A shows a representation of a portion (a tile) of a greyscale image which may be converted into a halftone screen. In this example, a high grey level value is indicated as a light color and a low grey level is indicated as a darker color. These grey levels may be converted into an array of threshold values, for example distributed between 0 and 1, or having the same value spread as pixel values in image data. FIG. 2B shows a tiled version of this pattern. FIG. 2C shows a representation of image data, which in this example describes a relatively simple image, but in other examples may for example be a more complex image. FIG. 2D shows an example of this image data having been halftoned using the tiled halftone screen encoding the pattern, which represents the appearance of a printed output.

A printer operator may apply the halftone screen to image data to determine print instructions, and print an image based thereon. Applying the halftone screen to image data may comprise associating at least one pixel of the screen with a pixel of the image data, comparing an image pixel value with the threshold value of the or each halftone screen pixel, and determining print instructions for each image pixel accordingly. In some examples, when a pixel value is compared to a threshold value, print agent may be applied to a location corresponding to the pixel if the pixel value is above the threshold and not otherwise. Therefore, a low threshold (black regions) will usually be associated with placement of print agent unless there is a void in the image data at this point (for example a blank portion of the image). However, a high threshold will usually be associated with no placement of print agent, even if an image is present at this point. In other examples, a number and/or size of print agent drops to be applied to a location may be determined, for example based on the threshold values of sub-pixels within a pixel, but a similar result may be seen. As noted above, in some examples, the halftone screen comprises a plurality of duplicated 'tiles', or else the print apparatus may use each halftone screen in a tiled manner.

The printed image may therefore have, at least to an extent, the greyscale image embedded therein.

A print apparatus may for example comprise print apparatus components such as print head(s), at least one print agent supply, and the like. Where the print apparatus is a 'two dimensional' printer, it may for example comprise a laser printer or an inkjet printer or the like, and may comprise a print head, substrate handling systems, sources of inks or toner, and the like. Where the printer is a 'three dimensional' printer, it may comprise, or be associated with, a print bed, a fabrication chamber, a print head, at least one energy source, a source of build material, or the like.

Figure 3:
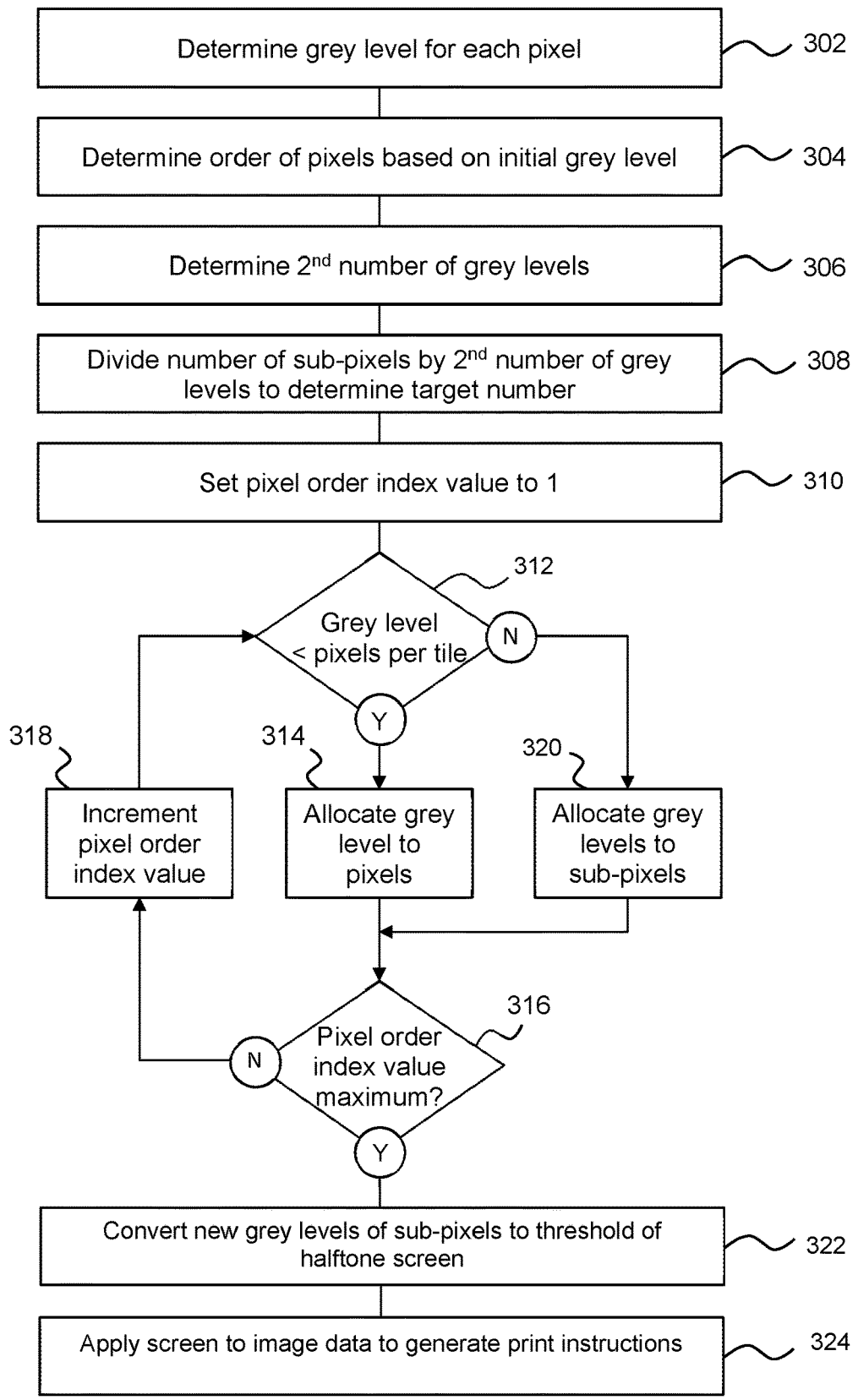
FIG. 3 is a flowchart of an example of another method of determining a halftone screen from a greyscale image.

FIG. 3 is another example of a method, which may comprise a computer implemented method implemented by one or more processors, of converting a greyscale image to a halftone screen, and may comprise an example of the method set out in FIG. 1. In this example, each pixel of the greyscale image comprises a plurality of sub-pixels. When converted to a halftone threshold screen, each pixel may correspond to a print addressable region. Looked at another way, the pixels of the greyscale image are grouped into sets of sub-pixels, each set of sub-pixels forming one image/print resolution pixel. In practice, this may be a tiled greyscale image.

The sub-pixels may define the size and/or number of drops or dots of print agent applied to a print addressable location. Taking the size of the dot/drop, this may be referred to as amplitude modulation. There may for example be three sub-pixels in a pixel, each having a threshold value.

In another example, there may be a square number of sub-pixels per print pixel. For example, where the resolution at which the halftone screen is to be defined is 2400 dpi and the image is to be printed at 800 dpi, there may be nine sub-pixels per pixel (as 2400/800=nine greyscale image values per image pixel).

In use of the halftone matrix derived from the greyscale image having three sub-pixels per pixel, a corresponding pixel in image data may be compared to the thresholds. If the image pixel value does not exceed any of the thresholds, then no print agent is deposited. If one threshold is exceeded, a small dot is provided. If two thresholds are exceeded, a medium sized dot is provided and if all three are exceeded, a larger dot is provided. In practice, different dot sizes may be provided by varying a laser power in laser printing, or varying a thermal resistor power in inkjet printing, or the like.

In block 302, a grey level for each pixel is determined, referred to herein after as an initial grey level, the initial grey level being the average of the grey levels of the sub-pixels of that pixel. Thus, taking the example of a pixel comprising three sub-pixels having values 40, 60 and 80, the average value, and the initial grey value, is 60.

Block 304 comprises determining an order of the pixels based on the initial grey level, wherein pixels having the same level are grouped. This may be carried out substantially as set out in relation to block 104 above.

Block 306 comprises determining a second number of grey levels, and may be carried out as described in relation to block 106.

Block 308 comprises dividing the number of sub-pixels in the greyscale image by an estimate of the second number of grey levels to determine a target number of sub-pixels per grey level. As will be apparent from the discussions which follow, determining the target number of sub-pixels per grey level also provides an indication of the target number of pixels per grey level, as there is a predetermined relationship between the number of sub-pixels and the number of pixels.

For example, for a 36 by 36 pixel image, each pixel having three sub-pixels, there are a total of 3888 sub-pixels, with a second number of grey levels as 750. Dividing 3888 by 750 gives 5.2 sub-pixels per grey level. As this is not a whole number, it may be rounded to 5 to ease subsequent processing (as only whole sub-pixels may be associated with a grey value). In this case as the number has been rounded down, there will be more than 750 grey levels for linearization/calibration. Therefore, in some examples, any floating point number may be rounded down. However, in practice, there may be fewer than 750 grey levels without undue visual impact when applying the halftone screen. It may be noted that five sub-pixels could also be expressed as 1.66667 pixels per grey level. As noted above, this may be used to define the second number of grey levels. In this example 3888/5=777.6, and therefore the second number of grey levels may be 778.

Block 310 comprises setting a pixel order index value to 1.

In this example, the method proceeds in a first manner until a threshold number of assigned grey levels is reached. In this example, the threshold is equal to the number of pixels in a tile divided by the number of pixels which make up a line of an intended line per inch resolution To discuss this in a little more detail, in some examples, in addition to dots per inch (dpi), there is another resolution at which images may be considered—that of 'lines per inch', or Ipi. This may be a measure of how closely spaced dots of a halftone grid may be. Higher values of Ipi are associated with higher quality of images. The target line per inch may be achieved by assigning more than one image pixel for each dot. For example, assuming that a target Ipi is 200 (which provides a reasonably good representation of print agent dot density (dots per area) in images), and the intended print resolution is 800 dpi, this implies that each line may be made up of 'super pixels', or 16 (4×4) image pixels.

This in turn defines the number of dots in a tile of an image. For example, returning to the 36 by 36 pixel image, this provides 81 ((36×36)/(4×4)=81) dots (or 'super pixels') for this image.

The size of each dot can be changed from a minimum of one pixel, to a size of several pixels (and sub-pixels). To consider an example in the context of amplitude modulation (higher grey levels may result in larger print agent dots being placed), a first non-zero grey level may be represented as a single-pixel (a dot of a size of one pixel) or alternatively, a dot with the minimum amount of ink accessible for that printer. The next grey level has two single-pixels printed, and so on. Once all the single-pixels of a tile are populated (for example, all 81 in the example above), then a first super pixel may be associated with a larger ink drop to generate a darker shade. In the above example one single pixel was added per each grey level. It is also possible to add several pixels at each grey level (and indeed a different number of pixels may be added for each level) for adding the intended ink amount for each level, which may have an impact on the applicable threshold number of grey levels.

In the above example, for the first 81 grey levels, there is no amplitude modulation. As a result, all the sub-pixels of a pixel will have a common value. However, for higher values, some pixels may be associated with greater amounts of print agent, and therefore the sub-pixels of a single pixel may have different values to one another.

Therefore, in a first loop of the method, it is determined if the grey level is less than the number of super pixels in a tile (block 312). If so, taking the first pixel in the order determined in block 304, the method proceeds by allocating a new grey level to the sub-pixels of the pixel index in block 314, to provide, on average, the determined target number of sub-pixels per grey level.

As will be appreciated, if the values of the sub-pixels are to be the same, unless the number of sub-pixels is an integer multiple of the number of sub-pixels per grey level, it may not be possible to allocate grey levels to pixels such that each grey level is associated with the same number of sub-pixels. Considering the example above, in which there are three sub-pixels per pixel and five sub-pixel per grey level, the method may start by selecting the pixel with the lowest initial grey level value (which it may be recalled is the average of its initial sub-pixel grey values). This first pixel may be associated with the lowest grey level of the second number of grey levels, giving three sub-pixels out of a target five sub-pixels. As this is below the intended number, the next pixel in the order determined in block 304 may also be associated with that same lowest grey level, but now the target has been overshot, with six sub-pixels being associated with the first grey-level. However, six is closer to the target five than three. The next grey level may then be selected and associated with the third pixel in the order. However, if the fourth pixel was also associated with this grey level, then the average would trend away from five, so in this case, just one pixel (three sub-pixels) is associated with the second grey level.

The method therefore continues, alternating between allocating 'too many' sub-pixels to a level and 'too few' to the next level, although in other examples other techniques, such as error diffusion techniques may be used to determine the number of sub-pixels to be assigned to any one grey level, until a number of sub-pixels which is equal to an integer multiple of the target number of sub-pixels per grey level is reached. In the above example, this occurs after three levels—two pixels having been allocated to the first grey level, one to the second and two to the third level—such that 15 sub-pixels have been allocated a new grey level, with an average of five per level. The pattern of 2-1-2 may then be repeated. While in this example, an alternating method was used, in other examples other techniques, such as error diffusion techniques may be used to determine the number of sub-pixels to be assigned to any one grey level.

Once the number of grey levels reaches the threshold of the number of super pixels in a tile (in the above example, once 81 grey levels have been allocated), the determination in block 312 is negative, so the method exits the first loop and, assuming that all pixels have not been associated with a grey level, (block 316), proceeds to a second loop. In the second loop, the sub-pixels of a single pixel may be allocated different grey levels in block 320. Therefore, in this example, the exact number of sub-pixels may be allocated to each grey level, e.g. in the case of pixels having three sub-pixels, where five sub-pixels are assigned a grey level, a single grey level may be assigned across two or three pixels.

The method then increments the index order number (block 318) before looping back to block 312. The method continues until it is determined that all pixels have been assigned a grey level (i.e. the maximum number of grey levels have been assigned) (block 316). At that point, the method proceeds to block 322 which comprises converting the new grey levels of each pixel to a threshold of a halftone screen, for example as set out in block 118 above.

Block 324 comprises applying, by at least one processor, the halftone screen to image data to determine print instructions for printing the image. Applying the threshold matrix to image data comprises comparing an image data value for a pixel to each of the threshold values of the sub-pixels of a corresponding pixel of the halftone screen; and determining an amount of print agent to be applied to a location on the substrate corresponding to that pixel based on how many of the threshold values are exceeded by an image data value.

In some examples, the method may further comprise printing an image, for example using a printing apparatus.

Figure 4:
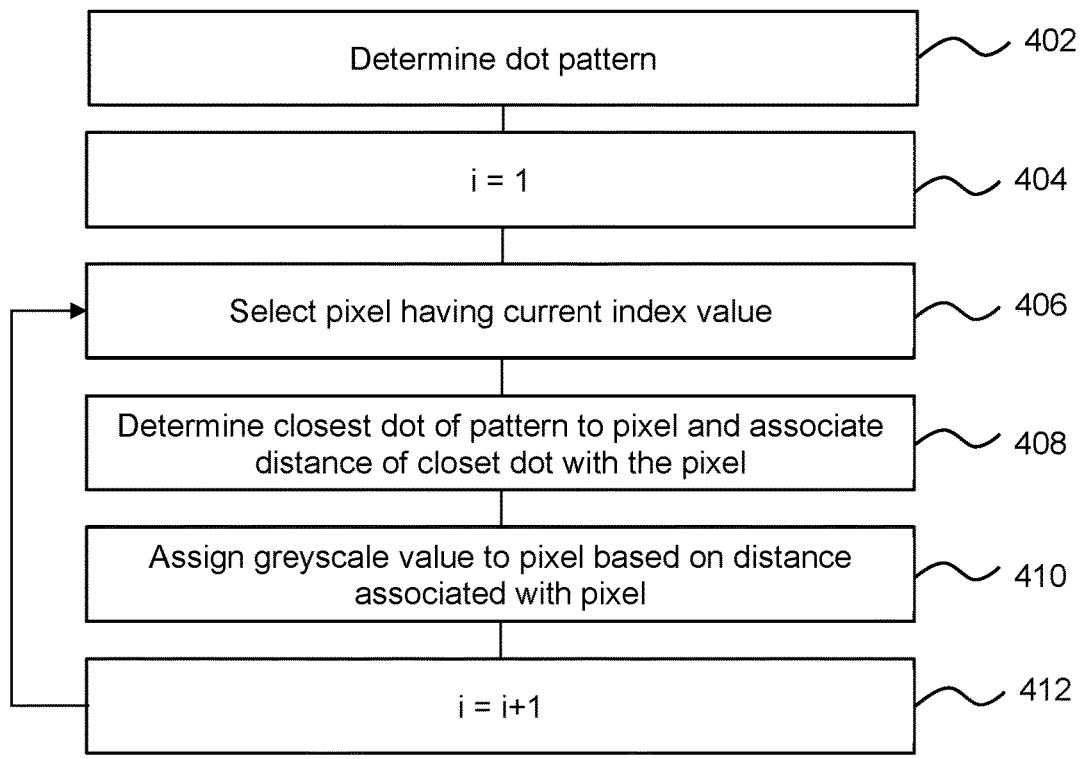
FIG. 4 is an example of a method for determining a greyscale image.

FIG. 4 is an example of a method of determining a greyscale image from a pattern, wherein the greyscale image may provide the greyscale image of FIG. 1 or 3. In this example the method is carried out by at least one processor, and comprises, in block 402, determining a dot pattern having a distribution of dots (or a point pattern having a distribution of points). The dots may for example be point locations, for example coordinates having floating point values. Determining the pattern may for example comprise receiving the pattern from a memory (for example, this may be a dot pattern created by a designer or the like), determining the pattern on an algorithmic basis, or the like.

Blocks 404 to 412 describe a method for deriving, from the dot pattern, a greyscale image comprising a plurality of pixels, each associated with a greyscale value.

Block 404 comprises setting an index value, i, to 1 and, in block 404, selecting the pixel having the current index value of 1. The pixel is the pixel intended to be defined in the greyscale image, and is selected from a pixel grid aligned with the dot pattern.

In this example, the dot pattern is a tiled pattern, i.e. comprises a repeating 'tile'. The dot pattern may be represented as a tile size and a list of dot-centre positions (x,y) within the tile, were x,y can be floating point numbers. This can be 'tiled' to form the repeating pattern.

Block 408 comprises determining the closest dot of the pattern to the pixel and associating a distance of the closest dot from the pixel with the pixel. For example, there may be a plurality of relatively close dots, and the closest of these is selected. The distance may for example be measured from the centre of the pixel to the dot, although in principle any reference point location on the pixel/dot may be used (given that the same reference point location may be used for each pixel). In some examples, the distance may be determined as a floating point number measured in terms of pixels. Note, in a tiled design, it may be the case that the closest dot is on an adjacent tile to the pixel rather than the same tile. It may be noted that, where the dots or points are relatively close to one another, the greyscale image may comprise lines.

Block 410 comprises assigning a greyscale value to the pixel based on the distance associated with that pixel. In some examples, the greyscale value may be proportional to the distance. In some examples, the distances may be normalised based on the maximum distance between a pixel such that the pixel having the greatest distance to its closest dot may be assigned the maximum greyscale value. For example, if the highest greyscale value is between 0 and 255, then 255 may be assigned to the pixel having the greatest distance to its closest dot, and 0 may be assigned to a distance of 0 (e.g. the dot coincides with the centre of the pixel). The greyscale values may be integer values (for example having been rounded) although they may in principle be floating point values. In this example, 0 in greyscale may be taken to be black whereas 255 is white. In other examples, the greyscale values may be converted into halftone thresholds. Where this is the case, the assigned greyscale values may be strictly between 0 and 255, and the absolute values of 0 and 255 may not be assigned, as these values may result in pixels being, in effect, 'always on' or 'always off', regardless of image data.

In block 412, the index number is incremented, and the method then loops back to block 406 for the new pixel.

In this way, a greyscale image based on the dot pattern may be determined. The dot pattern may be defined in a light-weight manner (e.g. using just one tile for a tiled design). The greyscale values of the image may provide the grey levels of a greyscale image as mentioned in relation to FIGS. 1-3.

Figure 5A:
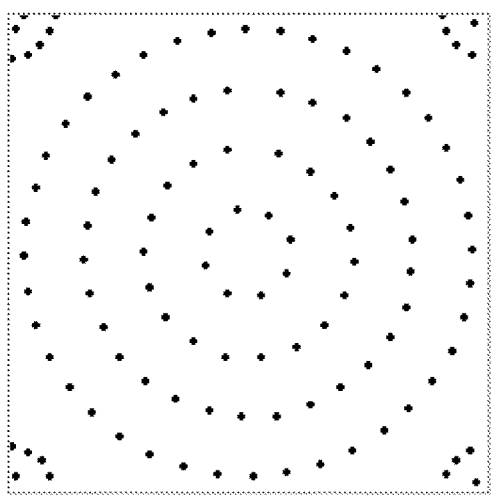
FIG. 5 shows examples of dot patterns.

FIG. 5A shows a tile of a dot pattern (or point pattern) which may be represented, for example as a size and a set of dot locations within the tile. The dot locations may for example be proportional to the tile size (for example, having an x and y location between 0 and 1, wherein the location may be a floating point number). In another example, the dot locations may be described algorithmically.

Figure 5B:
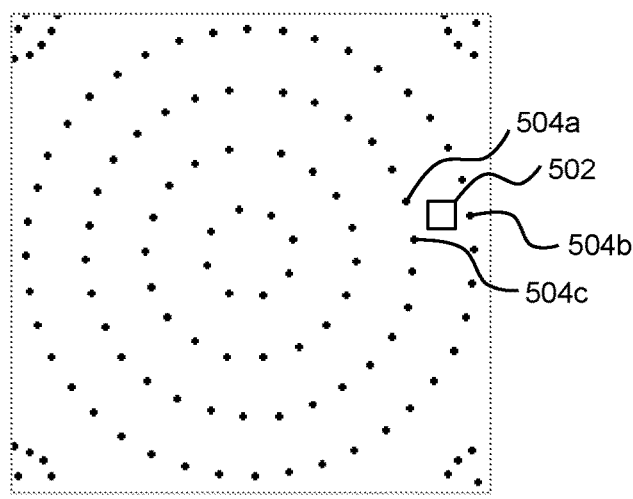

FIG. 5B shows a pixel 502 superimposed on a tiled pattern based thereon. The three closest dots 504a-c from the centre of the pixel 502 are indicated, and the closest of these is used to provide the distance which is associated with the pixel 502 as described in block 408 above. This distance may be converted into a greyscale value (or grey level).

Figure 6:
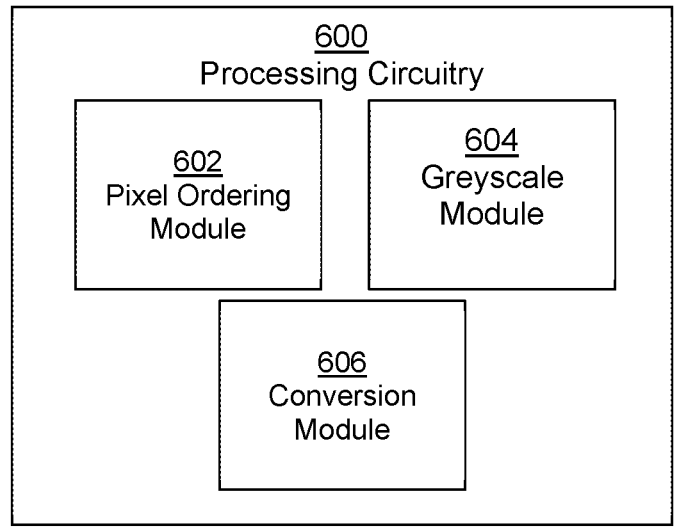
FIGS. 6 and 7 are simplified schematic drawings of example processing circuitry.

FIG. 6 is an example of processing circuitry 600 comprising a pixel ordering module 602, a greyscale module 604 and a conversion module 606.

In use of the processing circuitry 600, the pixel ordering module 602 may operate on a greyscale image having a plurality of pixels, each pixel being associated with a grey level of a first number of grey levels, and determine a position of the pixel in a pixel order based on the grey levels. The pixel ordering module 602 may order the pixels in order of increasing grey lever/greyscale value, for example from lowest to highest. Where the pixels comprise sub-pixels, the grey level associated with each pixel may be the average of the grey levels of the pixels (which may be determined by the processing circuitry 600). For example, the pixel ordering module 602 may carry out blocks 102 and/or 104 of FIG. 1 or blocks 302 and/or 304 of FIG. 3.

The greyscale module 604 is, in use of the processing circuitry 600, to determine a target number of grey levels, wherein the target number of grey levels is greater than the first number, and taking the pixels in pixel order, and the grey levels of the target number of grey levels in order of magnitude (small to large), allocate a grey level to each pixel to provide the target number of grey levels. For example, the greyscale module 604 may carry out any of blocks 106 to 116 of FIG. 1 or blocks 306 to 320 of FIG. 3. In some examples, the number of pixels per grey level may be the same. In other examples, the number of pixels per grey level may be the same after a threshold number of grey levels, wherein the threshold number is related to the intended print resolution (for example the lpi and dpi values, as set out above). In such examples, the number of pixels per grey levels may not be a whole number, for example being a whole number of sub-pixels which is not equal to a multiple of the number of sub-pixels per pixel. In examples where the pixels of the greyscale image comprise sub-pixels, the greyscale module may determine a target number of sub-pixels per grey level based on the number of sub-pixels and the target number of grey levels and allocate a grey level to each sub-pixel to provide, on average the target number of sub-pixels per grey level. As noted above, in some examples, below a threshold number, whole pixels may be allocated grey levels whereas above the threshold number (81 grey levels in the example above), one sub-pixel of a pixel may be allocated a first grey level while the next sub-pixel is allocated the next grey level.

The conversion module 606 is, in use of the processing circuitry 600, to convert the grey levels of pixels to a threshold of a halftone screen. Where the pixels comprise sub-pixels, the conversion module 606 may convert the grey levels of sub-pixels to a threshold of the halftone screen. For example, the conversion module 606 may carry out block 118 of FIG. 1 or block 322 of FIG. 3.

Figure 7:
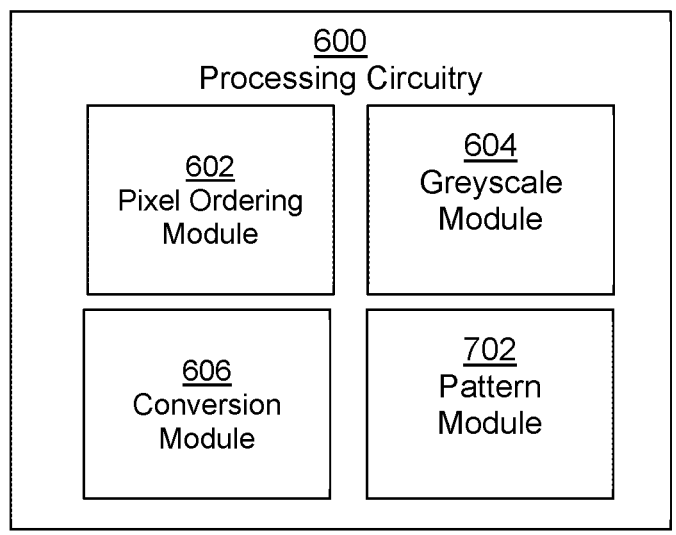

FIG. 7 is an example of processing circuitry 700 comprising, in addition to the pixel ordering module 602, a greyscale module 604 and a conversion module 606, a pattern module 702.

The pattern module 702 is, in use of the processing circuitry 600, to determine a dot pattern or point pattern having a repeated sub-pattern of dots or points; and for example, the pattern module 702 may carry out block 402 of FIG. 4.

In addition to the functions described above, in this example the greyscale module 604 is, in use of the processing circuitry 700, to determine a greyscale image of the dot pattern. In some examples, the greyscale image comprises a plurality of pixels each associated with a greyscale value, and the greyscale module 604 is, in use of the processing circuitry 700, to determine, for each pixel, a distance between that pixel and the closest dot and to assign a greyscale value to the pixel based on the distance. For example, the greyscale module 604 may carry out any of blocks 404 to 412 of FIG. 4. The greyscale values may provide the grey levels of the first number of grey levels.

Figure 8:
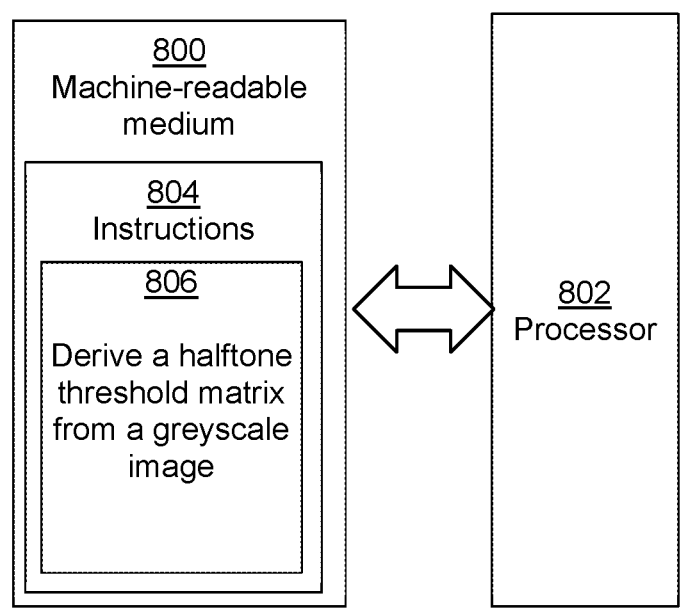
FIG. 8 is an example machine readable medium associated with a processor.

FIG. 8 is an example of a non-transitory machine readable medium 800 associated with a processor 802. The machine readable medium 800 stores instructions 804 which, when executed, cause the processor 802 to carry out tasks.

The instructions 804 may comprise instructions to cause the processor 802 to derive a halftone threshold matrix from a greyscale image having a first number of grey levels and a plurality of pixels. Deriving the halftone threshold matrix comprises increasing the number of grey levels in an image to a second number of grey levels by ordering the pixels based on the grey level of each pixel, and taking the pixels in pixel order (e.g. in an order of increasing magnitude of greyscale value), allocate a grey level of the second number of grey levels to each pixel to provide the target number of pixels per grey level, at least substantially evenly distributing the pixels between the grey levels. A threshold value for each pixel which is proportional to the grey level of that pixel may be assigned to the pixels. The halftone threshold matrix comprises the threshold values for the pixels, and may comprise any of the attributes of a threshold halftone screen mentioned above.

In some examples, the greyscale image has sub-pixel resolution, wherein each sub-pixel is associated with a grey level and a grey level of a pixel may be determined based on the average of the grey levels of the sub-pixels of each pixel. In such examples, a target number of sub-pixels per grey level may be determined based on the number of sub-pixels and the second number of grey levels, and taking the pixels in pixel order, a grey level of the second number of grey levels may be allocated to each sub-pixel to provide, on average, the target number of sub-pixels per grey level. A threshold value may be derived for each sub-pixel which is proportional to the grey level of the sub-pixel, and the halftone threshold matrix comprises the threshold values for the sub-pixels. In some examples, as set out above, below a threshold number of grey levels, sub-pixels may be allocated such that all the sub-pixels of a pixel have the same grey level, whereas above the threshold, sub-pixels of a pixel may be allocated different grey levels.

Examples in the present disclosure can be provided as methods, systems or machine readable instructions, such as any combination of software, hardware, firmware or the like. Such machine readable instructions may be included on a non-transitory machine (for example, computer) readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, or a module thereof, may execute the machine readable instructions. Thus functional modules of the processing circuitry 600, 700 (for example, the pixel ordering module 602, the greyscale module 604 the conversion module 606 and/or the pattern module 702)) and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising, by one or more processors:
receiving a greyscale image having a plurality of non-binary pixels, each non-binary pixel being associated with a grey level, and the greyscale image having a first number of grey levels;
determining an order of the non-binary pixels based on the grey level;
determining a second number of grey levels, wherein the second number of grey levels is greater than the first number;
determining an indication of a target number of non-binary pixels per grey level of the second number of grey levels;
taking the non-binary pixels in order, and based on the target number of non-binary pixels per grey level, allocating a new grey level to each non-binary pixel to provide the second number of grey levels; and
converting the new grey levels to thresholds of a threshold halftone screen.

2. A method according to claim 1 comprising generating the greyscale image by tiling a plurality of sub-images.

3. A method according to claim 1 wherein the non-binary pixels having the same grey level are arranged in a random order within a group.

4. A method according to claim 1, wherein:
each non-binary pixel of the greyscale image comprises a plurality of non-binary sub-pixels and the method further comprises:
determining a grey level for each non-binary pixel, the grey level being the average of the grey levels of the non-binary sub-pixels of that non-binary pixel;
wherein determining an indication of a target number of non-binary binary pixels per grey level comprises dividing the number of non-binary sub-pixels in the greyscale image by an estimate of the second number of grey levels to determine a target number of non-binary sub-pixels per grey level; and
wherein allocating a new grey level to each non-binary pixel comprises allocating, on average, the target number of non-binary sub-pixels to each grey level.

5. A method according to claim 4 wherein the target number of non-binary sub-pixels per grey levels is a whole number determined by rounding the result of dividing the number of non-binary sub-pixels by an approximation of an intended second number of grey levels.

6. A method according to claim 4 wherein allocating a grey level to each non-binary pixel comprises, below a threshold grey level, allocating the same grey level to each non-binary sub-pixel of a non-binary pixel.

7. A method according to claim 1 wherein converting the grey levels of each non-binary pixel to a threshold of a threshold matrix comprises determining a ratio of the grey level to the second number of grey levels.

8. A method according to claim 1, comprising determining the greyscale image, wherein determining the greyscale image comprises:

determining a dot pattern having a distribution of dots;
deriving, from the dot pattern, a greyscale image comprising a plurality of non-binary pixels each associated with a greyscale value,
wherein deriving the greyscale image comprises:
for each non-binary pixel, determining the closest dot to the non-binary pixel and associating a distance of the closest dot from the non-binary pixel with that non-binary pixel; and
assigning a greyscale value to each non-binary pixel, wherein the greyscale value is based on the distance associated with that non-binary pixel and provides the grey level of the first number of grey levels.

9. A method according to claim 1 further comprising applying, by at least one processor, the halftone screen to image data to determine print instructions for printing the image.

10. A method according to claim 9 wherein applying the threshold matrix to image data comprises comparing an image data value for a non-binary pixel to each of the threshold values of a corresponding non-binary pixel of the halftone screen; and
determining an amount of print agent to be applied to a location on the substrate corresponding to that non-binary pixel based on the comparison.

11. Processing circuitry comprising:
a pixel ordering module to, for a greyscale image having a plurality of non-binary pixels, each non-binary pixel being associated with a grey level of a first number of grey levels, determine a position of the non-binary pixel in a pixel order based on the grey levels wherein non-binary pixels having the same grey level are grouped in the pixel order;
a greyscale module to:
determine a target number of grey levels, wherein the target number of grey levels is greater than the first number, and
taking the non-binary pixels in pixel order, allocate a grey level to each non-binary pixel to provide the target number of grey levels; and
a conversion module to convert the grey levels of non-binary pixels to thresholds of a halftone screen.

12. Processing circuitry according to claim 11, wherein the image has non-binary sub-pixel resolution, wherein each non-binary sub-pixel is associated with a grey level, and the grey level of a non-binary pixel is an average grey level of the non-binary sub-pixels of that non-binary pixel;
wherein the greyscale module is to:
determine a target number of non-binary sub-pixels per grey level based on the number of non-binary sub-pixels and the target number of grey levels, and
allocate a grey level to each non-binary sub-pixel to provide, on average, the target number of non-binary sub-pixels per grey level; and
the conversion module is to convert the grey levels of non-binary sub-pixels to thresholds of the halftone screen.

13. Processing circuitry according to claim 11 which further comprises:

a pattern module, to determine a dot pattern having a repeated sub-pattern of dots; and wherein
the greyscale module is to determine a greyscale image from the dot pattern, the greyscale image comprising a plurality of non-binary pixels each associated with a greyscale value, wherein the greyscale module is to determine, for each non-binary pixel, a distance between that non-binary and the closest dot and to assign a greyscale value to the non-binary pixel based on the distance.

14. Non-transitory machine readable medium storing instructions which, when executed, cause a processor to:
derive a halftone threshold matrix from a greyscale image having a first number of grey levels and a plurality of non-binary pixels, wherein each non-binary pixel is associated with a grey level;
wherein deriving the halftone threshold matrix comprises:
increasing the number of grey levels in the image to a second number of grey levels by:
ordering the non-binary pixels based on their grey level;
taking then non-binary pixels in pixel order and the grey levels of the second number of grey levels in grey level order, allocate a grey level of the second number of grey levels to each non-binary pixel, evenly distributing the non-binary pixels between the grey levels; and
deriving a threshold value for each non-binary pixel which is proportional to the grey level of the non-binary pixel; wherein
the halftone threshold matrix comprises the threshold values for the non-binary pixels.

15. Non-transitory machine readable medium according to claim 14, storing further instructions which, when executed, cause a processor to:
derive a halftone threshold matrix from the greyscale image having a first number of grey levels wherein the greyscale image has non-binary sub-pixel resolution, wherein each non-binary sub-pixel is associated with a grey level;
wherein deriving the halftone threshold matrix comprises:
increasing the number of grey levels in the image to the second number of grey levels by:
determining a grey level of a non-binary pixel based on the average of the grey levels of the non-binary sub-pixels of each non-binary pixel;
determining a target number of non-binary sub-pixels per grey level based on the number of non-binary sub-pixels and the second number of grey levels;
taking the non-binary pixels in pixel order, allocate a grey level of the second number of grey levels to each non-binary pixel to provide, on average, the target number of non-binary sub-pixels per grey level; and
deriving a threshold value for each non-binary sub-pixel which is proportional to the grey level of the non-binary sub-pixel; wherein
the halftone threshold matrix comprises the threshold values for the non-binary sub-pixels.

* * * * *